United States Patent [19]

Yokota et al.

[11] Patent Number: 4,851,121

[45] Date of Patent: Jul. 25, 1989

[54] PROCESS FOR RENDERING POROUS MEMBRANE HYDROPHILIC

[75] Inventors: Minoru Yokota; Hiroshi Kawasaki, both of Kanagawa, Japan

[73] Assignee: Fuji Photo Film Co., Ltd., Kanagawa, Japan

[21] Appl. No.: 259,658

[22] Filed: Oct. 19, 1988

[30] Foreign Application Priority Data

Oct. 19, 1987 [JP] Japan .................................. 62-263322

[51] Int. Cl.$^4$ ............................................. B01D 13/04
[52] U.S. Cl. ........................... 210/500.36; 210/500.41; 210/500.42; 264/232
[58] Field of Search ............... 210/634, 638, 639, 642, 210/644, 649, 650, 651, 652–654, 500.21, 500.22, 500.27, 500.28, 500.33, 500.36, 500.41, 500.42, 500.43; 264/232, 233, 238, 340, 349

[56] References Cited

U.S. PATENT DOCUMENTS 4,659,474 4/1987 Perry et al. ..................... 210/638

Primary Examiner—Frank Sever
Attorney, Agent, or Firm—Sughrue, Mion, Zinn, Macpeak & Seas

[57] ABSTRACT

A process for rendering a porous membrane hydrophilic is disclosed, which comprises crosslinking at least one compound represented by the following general formula using an alkali at the fine pore surface of a porous material:

General Formula (I)

$$\text{(I)} \quad X_1-SO_2-L-SO_2-X_2$$

wherein $X_1$ and $X_2$, which may be the same or different, each represents $-CH=CH_2$ or $-CH_2CH_2Y$, Y represents a group capable of being eliminated by a base in the form of HY, and L represents a divalent group which may be substituted.

11 Claims, No Drawings

PROCESS FOR RENDERING POROUS MEMBRANE HYDROPHILIC

FIELD OF THE INVENTION

The present invention relates to a process for rendering a porous membrane hydrophilic.

BACKGROUND OF THE INVENTION

Porous membranes composed of a hydrophobic high molecular weight polymers such as polyolefin exhibit excellent water resistance and chemical resistance. Further, these membranes are widely used for various applications, including the preparation of pure water for the electronics industry, manufacturing water purifiers for preparing potable water, and the preparation of sterilized water for medicines.

However, hydrophobic porous membranes are defective in that a liquid with a high surface tension, such as water is unable to permeate the membrane due to its low critical interfacial tension.

Therefore, to filter water or aqueous solutions through a hydrophobic porous membrane, previously it has been necessary to wet the fine pores of the membrane with a water-soluble organic solvent such as an alcohol, and then replace the solvent with water. However, this technique is defective in that, upon the removal of water, the membrane again acquires hydrophobic properties. Thus, when in filtering water or an aqueous solution through the membrane, the above-described processing with a hydrophilic organic solvent and subsequent replacement of the solvent by water must be repeated. Alternatively, the porous membrane must not be allowed to dry out. Consequently, the membrane must be kept in a state of being dipped in water. This involves the problem of inconvenience in preservation and transportation of the membrane and the possibility of change in quality of water during preservation. Thus, hydrophobic porous membranes possessing water-permeating properties without use of hydrophilic solvents or without preservation in water have been desired.

Techniques attempting to meet the above objective include conducting a corona discharge treatment and treating the filter with a strong oxidizing chemical agent. In addition, chemical surface-modifying processes such as irradiating a porous films surface with a hydrophilic monomer as described in JP-A-56-38333, plasma-treating a hydrophobic resin porous structure impregnated with a water-soluble high polymer or a surfactant as described in JP-A-56-157437, and depositing a nonionic ester of a hydrocarbon moiety and an organic mono-acid containing 8 to 30 carbon atoms (for example, mixture of sorbitan mono-esters of capric acid, lauric acid, myristic acid, palmitic acid and/or oleic acid, Span 20 (trade name)) onto a porous membrane as described in JP-A-59-501049, have been proposed. (The term "JP-A" as used herein means an "unexamined published Japanese patent application".)

However, utilization of the corona discharge treatment results in a highly detrimental change in pore structure of the porous membrane. Further, permanent hydrophilic properties are not obtained. In addition, treating the filter with a strong oxidizing chemical agent has the defect that it seriously damages the substrate of porous membrane.

The radiation- or plasma-treating process is not practically applicable because it costs too much, though some slight improvement is observed.

Further, treatment with Span 20 results in a porous membrane which gives off such an offensive smell that it is generally not usable for use in water purifiers for obtaining potable water. However, the thus-treated membrane is rendered hydrophilic to a slight extent. Further, water obtained from a purification process utilizing the thus-treated membrane exhibits a foaming phenomenon.

SUMMARY OF THE INVENTION

It is an object of the present invention to provide a porous membrane at low cost which is free from the above recited defects, i.e., it does not undergo a change in pore structure or suffer damage to the substrate, which, after being rendered hydrophilic, does not lose its hydrophilic nature even when water is removed, and which can provide filtered water without foaming and without giving off an offensive smell.

This and other objects of the present invention will become apparent from the following description thereof.

The above-described and other objects of the present invention are attained by a process for rendering a porous membrane hydrophilic which comprises crosslinking at least one compound represented by the following general formula (hereinafter abbreviated as compound (I)) using an alkali at the fine pore surface of the porous membrane:

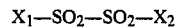

wherein $X_1$ and $X_2$, which may be the same or different, each represents $-CH=CH_2$ or $-CH_2CH_2Y$, Y represents a group capable of being replaced by a nucleophilic group or a group capable of being eliminated by a base in the form of HY, i.e., a good leaving group such as a weak base (for example, a halogen atom such as fluorine, chlorine, bromine and iodine, a sulfonyloxy group or a monoester of sulfuric acid), L represents an optionally substituted divalent linking group.

DETAILED DESCRIPTION OF THE INVENTION

Specific examples of $X_1$ and $X_2$ are illustrated below:

$-CH=CH_2$, $-CH_2CH_2Cl$, $-CH_2CH_2Br$, $-CH_2CH_2OSO_2CH_3$,

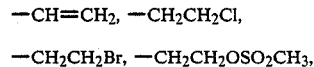

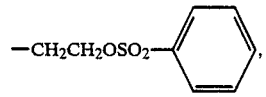

$-CH_2CH_2OSO_3Na$, $-CH_2CH_2OSO_3K$, $-CH_2CH_2OH$, $-CH_2CH_2OCOCH_3$, $-CH_2CH_2OCOCF_3$, and $-CH_2CH_2OCOCHCl_2$.

Of these, —CH=CH$_2$, —CH$_2$CH$_2$Cl, —CH$_2$CH$_2$Br, —CH$_2$CH$_2$OSO$_2$CH$_3$, and CH$_2$CH$_2$OSO$_3$Na, are particularly preferred. The number of carbon atoms in the group Y preferably ranges from 1 to 7.

The divalent linking group L preferably has from 1 to 12 carbon atoms and includes an alkylene group having 1 to 12 carbon atoms, an arylene group having 6 to 12 carbon atoms, or a group formed by combining these groups and one or more of linking groups represented by —O—,

—CO—, —SO—, —SO$_2$—, —SO$_3$—,

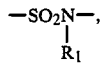

—COO—,

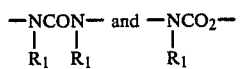

wherein R$_1$ represents a hydrogen atom, an alkyl group having 1 to 15 carbon atoms or an aralkyl group having 7 to 15 carbon atoms. When two or more of

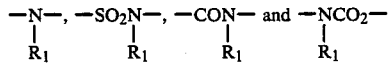

are contained, the R$_1$ groups may be bound to each other to form a ring, for example,

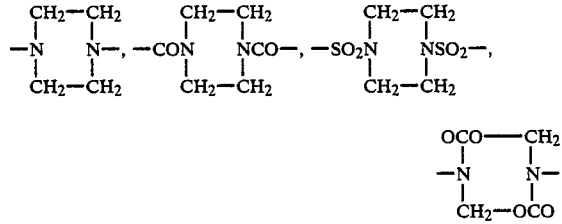

etc. Further, L has a substitutent or substituents such as a hydroxyl group, an alkoxy group having 1 to 15 carbon atoms, a carbamoyl group, a sulfamoyl group, an alkyl group having 1 to 15 cabon atoms, and an aryl group having 6 to 15 carbon atoms. The substituent may further be substituted by one or more groups represented by X$_3$—SO$_2$— wherein X$_3$ is the same as defined for the foregoing X$_1$ and X$_2$.

Typical examples of L are illustrated below. In the following formulae, a to v each represents an integer of 1 to 6, with d alone being able to be 0. d, k, l and p are preferably 1 to 3, and the remaining ones other than d, k, l and p are preferably 1 or 2. R$_1$ preferably represents a hydrogen atom or an alkyl group having 1 to 6 carbon atoms, with a hydrogen atom, a methyl group or an ethyl group being particularly preferred.

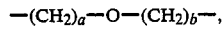

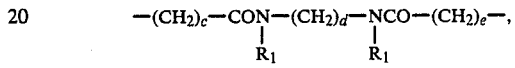

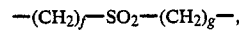

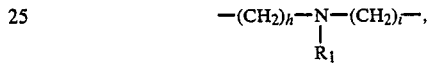

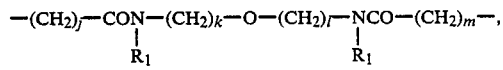

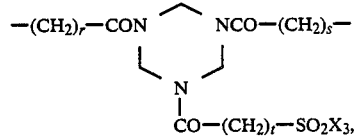

Processes for synthesizing the compounds (I) to be used for the present invention are described in, for example, JP-B,50-35807, U.S. Pat. No. 4,137,082 (corresponding to JP-B-56-48860), JP-A-49-24435, and JP-A-59-18944. (The term "JP-B" as used herein means an "examined Japanese patent publication").

Examples of typical compounds to be used in the present invention are illustrated below which, however, do not limit the present invention in any way.

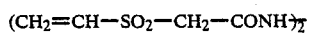
(1)

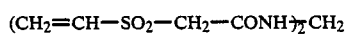
(2)

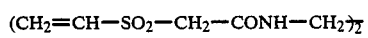
(3)

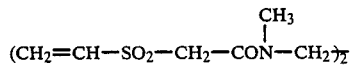
(4)

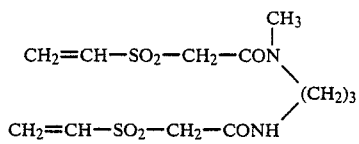  5

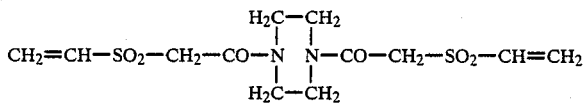  6

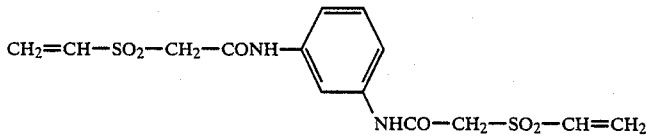  7

$(CH_2=CH-SO_2-CH_2-CONH-CH_2)_2CH_2$  8

$(CH_2=CH-SO_2-CH_2)_2O$  9

$(CH_2=CH-SO_2-CH_2CH_2)_2O$  10

$(CH_2=CH-SO_2-CH_2CH_2CONH-CH_2)_2$  11

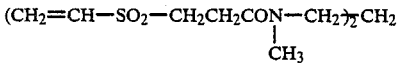  12

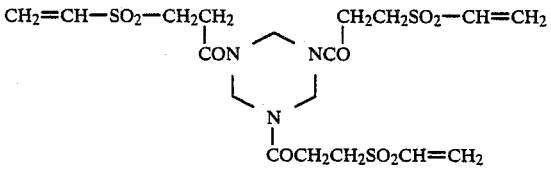  13

$CH_2=CHSO_2CH_2CH_2CONHCH_2CH_2NHCOCH_2CH_2SO_2CH_2CH_2$
                                                        $|$
                                                   $OSO_3Na$  14

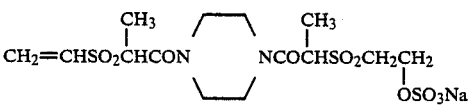  15

The art of the present invention is described in more detail below.

The porous membrane for use in the present invention is preferably made of a material stable against strong alkali, for example, the polymers such as polyvinylidene fluoride, polytetrafluoroethylene, polysulfone, polyether sulfone, polyethylene or polypropylene. However, porous membranes made of a material having a poor durability against a comparatively strong alkali may also be used by employing a weak alkali. The effect of the present invention is remarkable with respect to hydrophobic porous membranes, but hydrophilic porous membranes of, for example, cellulose type may also be used. The porous membrane for use in the present invention may be of any known form including hollow filaments, tubes, and films.

To retain compound (I) on the fine pore surface of porous membrane, the membrane is submerged in a solution containing the compound for a period of about 1 to about 30 seconds and is dried to remove the solvent. The manner of drying is not particularly limited, and any known drying techniques including drying at atmospheric temperatures and heat-drying may be utilized. However, the drying is preferably conducted at a temperature of about 50° C. to about 150° C. for a period of from about 1 to about 120 minutes. The concentration of the compound in solution is about 0.1 to about 10%, preferably 0.5 to 5%. Further, any solvent may be employed s long as it dissolves the compound in the concentrations described above. Examples of solvents which can be used include dimethylformamide, dimethyl sulfoxide, dimethylacetamide, water, a mixture of water and an alcohol such as methanol, etc.

The strong alkali for use in the present invention serves to crosslink at least one compound of the general formula (I). That is, at least one compound of the general formula (I) is crosslinked in the presence of a strong alkali to form a strong, hydrophilic coat on the fine pore surface of the porous membrane. Thus, a membrane possessing permanent hydrophilic properties is obtained.

Preferred examples of alkalis for use in the present invention include alkali hydroxides such as cesium hydroxide, rubidium hydroxide, lithium hydroxide, sodium hydroxide and potassium hydroxide. Of these, sodium hydroxide and potassium hydroxide are particularly preferred.

The alkali treatment for crosslinking at least one compound of general formula (I) may be conducted either before or after retaining the compound on the fine pore surface of the porous membrane. Namely, the fine pore surface of porous membrane may first be impregnated with an alkali before retaining the compound on the fine pore surface or, alternatively, the compound may first be retained on the fine pore surface of porous membrane before conducting the alkali treatment. To impregnate the membrane with an alkali, the membrane may be dipped in an alkali solution for a period of about 1 to about 30 seconds and then dried in the same manner as previously discussed to retain the compound (I), preferably at a temperature of from about 50° C. to about 150° C. for a period of from about 1 to about 120 minutes. The concentration of the alkali solution is $10^{-6}$N (pH=8) to 10N, preferably $10^{-4}$N (pH=10) to 10N (pH=14).

If the concentration is less than $10^{-6}$N, alkalinity is too weak to fully crosslink the compound, and the compound will be washed away upon permeation of water, thus permanent hydrophilic properties will not be obtained. On the other hand, if a concentration of more than 10N is used, the alkalinity is so strong that a reduction in membrane strength may occur.

Crosslinking of the compound by a strong alkali occurs almost instantly, and hence washing may be conducted immediately after retaining compound (I) on the fine pore surface of membrane. However, in order to obtain sufficiently durable hydrophilic properties, the time before water washing may be prolonged as long as possible, for example, preferably for a period of about 30 to about 300 seconds.

The present invention is now illustrated in greater detail by reference to the following examples which, however, are not to be construed as limiting the present invention.

EXAMPLE 1

A hydrophobic polysulfone porous membrane (average pore size: 0.2 μm) was dipped for 30 seconds in a 1N methanolic solution of sodium hydroxide and then heat-dried at 70° C. for 10 minutes. Next, the membrane was dipped for 3 seconds in an aqueous methanol solution (water:methanol=1:1 by volume) containing 4 wt% of Compound 1 of the present invention having the following formula:

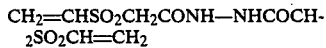

The membrane was then immediately washed with water to remove the alkali and the unreacted compound, thus obtaining a hydrophilic porous membrane. The average pore size and pore size distribution were not changed in the above described treatment. Further, absolutely no change in pore structure and no damages to the substrate of the porous membrane were observed. The thus obtained hydrophilic porous membrane showed good hydrophilic nature even without pretreatment with, for example, an alcohol to render it hydrophilic, and showed a water-permeating rate of 55.9 ml/min·cm$^2$ under a pressure of 1 kg/cm$^2$. In addition, the membrane did not lose its hydrophilic nature even when the membrane was dried after measurement of the water-permeating rate. The water-permeating rate after drying remained absolutely the same. Water filtered through the membrane did not foam and gave off no offensive smells.

EXAMPLE 2

Example 2 was conducted according to Example 1 except that the membrane was first dipped in the solution of the compound and dried, and then dipped in the methanolic solution of sodium hydroxide and dried, i.e., reverse of Example 1. Thus, the same hydrophilicity-imparting effect as in Example 1 was obtained, and the resulting membrane showed a water-permeating rate of 58.8 ml/min·cm$^2$ under a pressure of 1 kg/cm$^2$.

EXAMPLE 3

The porous membrane used in Example 1 was subjected to the hydrophilic treatment in the same manner as described in Example 1, except that Compound 8 of the present invention is used in place of the compound of the present invention. The resulting membrane showed a water-permeating rate of 53.0 ml/min·cm$^2$, when determined as described in Example 1, which is similar to the performance of the membrane obtained in Example 1.

EXAMPLE 4

The hydrophilic treatment as described in Example 3 was conducted in the same manner as described in Example 2, i.e., in a reverse manner of Example 3. The resulting membrane showed a water-permeating rate of 57.2 ml/min·cm$^2$, when determined as described in Example 1, which is similar to the performance of the membrane obtained in Example 1.

EXAMPLE 5

The porous membrane used in Example 1 was subjected to the hydrophilic treatment in the same manner as described in Example 1, except that Compound 3 of the present invention is used in place of the compound of the present invention. The resulting membrane showed a water-permeating rate of 51.5 ml/min·cm$^2$, when determined as described in Example 1, which is similar to the performance of the membrane obtained in Example 1.

EXAMPLE 6

The hydrophilic treatment as described in Example 5 was conducted in the same manner as described in Example 2, i.e., in a reverse manner of Example 5. The resulting membrane showed a water-permeating rate of 50.2 ml/min·cm$^2$, when determined as described in Example 1, which is similar to the performance of the membrane obtained in Example 1.

EXAMPLE 7

A hydrophobic polyvinylidene fluoride porous membrane (average pore size: 0.2 μm) was dipped for 30 seconds in a 1N methanolic solution of sodium hydroxide and then heat-dried at 90° C. for 15 minutes. Next, the membrane was dipped for 10 seconds in an aqueous solution containing 4 wt% of Compound 7 of the present invention having the following formula:

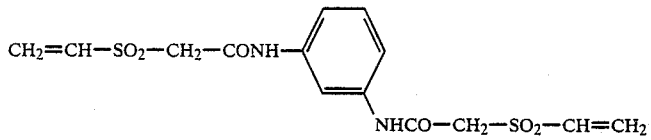

The membrane was then immediately washed with water to remove the alkali and the unreacted compound, thus obtaining a hydrophilic porous membrane. The average pore size and pore size distribution were not changed in the above described treatment. Further, absolutely no change in pore structure and no damages to the substrate of the porous membrane were observed. The thus obtained hydrophilic porous membrane showed good hydrophilic nature even without pre-treatment with, for example, an alcohol to render it hydrophilic, and showed a water-permeating rate of 14.5 ml/min·cm² under a pressure of 1 kg/cm². In addition, the membrane did not lose its hydrophilic nature even when the membrane was dried after measurement of the water-permeating rate. The water-permeating rate after drying remained absolutely the same. Water filtered through the membrane did not foam and gave off no offensive smells.

EXAMPLE 8

A hydrophobic polytetrafluoroethylene porous membrane (average pore size: 0.2 μm) was dipped for 30 seconds in a 1N methanolic solution of potassium hydroxide and then heat-dried at 70° C. for 10 minutes. Next, the membrane was dipped for 10 seconds in a dimethylacetamide solution containing 4 wt% of Compound 8 of the present invention having the following formula:

$$CH_2=CHSO_2CH_2CONH-CH_2CH_2C_2-NHCOCH_2SO_2CH=CH_2$$

The membrane was then immediately washed with water to remove the alkali and the unreacted compound, thus obtaining a hydrophilic porous membrane. The average pore size and pore size distribution were not changed in the above described treatment. Further, absolutely no change in pore structure and no damages to the substrate of the porous membrane were observed. The thus obtained hydrophilic porous membrane showed good hydrophilic nature even without pre-treatment with, for example, an alcohol to render it hydrophilic, and showed a water-permeating rate of 17.7 ml/min·cm² under a pressure of 1 kg/cm². In addition, the membrane did not lose its hydrophilic nature even when the membrane was dried after measurement of the water-permeating rate. The water-permeating rate after drying remained absolutely the same. Water filtered through the membrane did not foam and gave off no offensive smells.

EXAMPLE 9

A hydrophobic polypropylene porous membrane (average pore size: 0.2 μm) was dipped for 30 seconds in a 1N methanolic solution of potassium hydroxide and then heat-dried at 50° C. for 20 minutes. Next, the membrane was dipped for 30 seconds in an aqueous solution containing 2 wt% of Compound 3 of the present invention having the following formula:

$$CH_2=CHSO_2CH_2CONH-CH_2CH_2-NHCOCH_2SO_2CH=CH_2$$

The membrane was then immediately washed with water to remove the alkali and the unreacted compound, thus obtaining a hydrophilic porous membrane. The average pore size and pore size distribution were not changed in the above described treatment. Further, absolutely no change in pore structure and no damages to the substrate of the porous membrane were observed. The thus obtained hydrophilic porous membrane showed good hydrophilic nature even without pre-treatment with, for example, an alcohol to render it hydrophilic, and showed a water-permeating rate of 17.3 ml/min·cm² under a pressure of 1 kg/cm². In addition, the membrane did not lose its hydrophilic nature even when the membrane was dried after measurement of the water-permeating rate. The water-permeating rate after drying remained absoluely the same. Water filtered through the membrane did not foam and gave off no offensive smells.

COMPARATIVE EXAMPLE

An attempt to measure the water-permeating rate of an untreated membrane of the type used in each of Examples 1, 7, 8 and 9 resulted in a water-permeating rate of zero under a pressure of 1 kg/cm².

The porous membrane according to the present invention possesses excellent hydrophilic properties. It exhibits excellent hydrophilic properties even without pre-treatment with, for example, an alcohol for rendering it hydrophilic, and undergoes no deterioration of filtering properties even when it is dried during or after filtration. In addition, it exhibits no change in pore structure and suffers no damage to the porous membrane substrate. The present membrane may be produced at a low cost, and water filtered therethrough does not foam and gives off no offensive smells. Thus, the practical advantages of the present invention are extremely great.

While the invention has been described in detail and with reference to specific embodiments thereof, it will be apparent to one skilled in the art that various changes and modifications can be made therein without departing from the spirit and scope thereof.

What is claimed is:

1. A process for rendering a porous membrane hydrophilic, comprising the step of:
   providing water permeating properties sufficient to preclude the use of hydrophilic solvents or preservation in water, by crosslinking at least one compound represented by general formula (I) at the fine pore surface of the porous membrane utilizing an alkali, (I) $X_1-SO_2-L-SO_2-X_2$ wherein $X_1$ and $X_2$ are each selected from the group consisting of $-CH=CH_2$ and $-CH_2CH_2Y$, Y represents a group capable of being replaced by a nucleophilic group or a group capable of being eliminated by a base in the form of HY, and L comprises a divalent linking group which may be substituted.

2. A process according to claim 1, wherein said step of crosslinking comprises the steps of:
submerging a hydrophobic porous membrane in an alkali solution;
drying the membrane;
submerging the membrane in a solution containing at least one compound of general formula (I) whereby said compound is crosslinked upon contact with the alkali; and
washing said membrane with water to remove alkali and unreacted compound (I).

3. A process according to claim 2, wherein said step of submerging the membrane in compound (I) is performed prior to submergence in alkali and said step of drying is performed after said step of submergence in compound (I) and before said step of submergence in alkali.

4. A process according to claim 1, wherein Y is selected from the group consisting of a fluorine atom, a chlorine atom, a bromine atom, an iodide atom, a sulfonyloxy group and a monoester of sulfuric acid, and L is selected from the group consisting of an alkylene group, an arylene group and a group formed by combining these groups with at least one linking group, and wherein said alkali comprises an alkali hydroxide.

5. A process according to clam 4, wherein each of $X_1$ and $X_2$ is selected from the group consisting of $-CH=CH_2$, $-CH_2CH_2Cl$, $-CH_2CH_2Br$, $-CH_2CH_2OSO_2CH_3$ and $-CH_2CH_2OSO_3Na$ and said alkali is selected from the group consisting of cesium hydroxide, rubidium hydroxide, lithium hydroxide, sodium hydroxide and potassium hydroxide.

6. A process according to claim 5, wherein compound (I) comprises $CH_2=CHSO_2CH_2CONH-NHCOCH_2SO_2CH=CH_2$, $CH_2CHSO_2CH_2CONH-CH_2CH_2-NHCOCH_2SO_2CH=CH_2$,

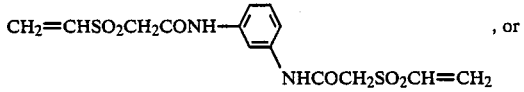

$CH_2=CHSO_2CH_2CONH-CH_2CH_2CH_2-NHCOCH_2SO_2CH=CH_2$, and said alkali comprises sodium hydroxide or potassium hydroxide.

7. A water-permeable hydrophobic membrane, comprising:
a hydrophobic porous membrane; and
at least one hydrophilic compound having properties for providing water permeating properties sufficient to preclude the use of hydrophilic solvents or preservation in water, of general formula (I) crosslinked on the membrane surface by an alkali, (I) $X_1-SO_2-L-SO_2-X_2$ wherein $X_1$ and $X_2$ are selected from the group consisting of $-CH=CH_2$ and $-CH_2CH_2Y$, Y represents a group capable of being replaced by a nucleophilic group or a group capable of being eliminated by a base in the form of HY, and L is a divalent linking group which may be substituted.

8. A porous membrane according to claim 7, wherein said membrane is of a material selected from the group consisting of polyvinylidene fluoride, polytetrafluoroethylene, polysulfone, polyethersulfone, polyethylene and polypropylene, and
Y is selected from the group consisting of a fluorine atom, a chlorine atom, a bromine atom, an iodine atom, a sulfonyloxy group, and a monoester of sulfuric acid, and
$X_1$ and $X_2$ are each selected from the group consisting of $-CH=CH_2$, $-CH_2CH_2Cl$, $-CH_2CH_2Br$, $-CH_2CH_2OSO_2-CH_3$ and $-CH_2CH_2OSO_3Na$, and
said alkali is selected from the group consisting of cesium hydroxide, rubidium hydroxide, lithium hydroxide, sodium hydroxide and potassium hydroxide.

9. A membrane according to claim 8, wherein said porous membrane comprises polysulfone, polyvinylidene fluoride, polytetrafluoroethylene, or polypropylene, and said compound (I) comprises $CH_2=CHSO_2CH_2CONH-NHCO-CH_2SO_2CH=CH_2$, $CH_2=CHSO_2CH_2CONH-CH_2CH_2-NHCOCH_2SO_2CH=CH_2$,

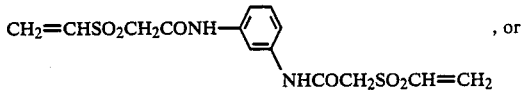

$CH_2=CHSO_2CH_2CO-NH-CH_2CH_2CH_2-NHCOCH_2SO_2CH=CH_2$, and said alkali comprises sodium hydroxide or potassium hydroxide.

10. A membrane according to claim 8, wherein L has a substituent or substituents selected from a hydroxyl group, an alkoxy group having 1 to 15 carbon atoms, a carbamoyl group, a sulfamoyl group, an alkyl group having 1 to 15 carbon atoms and an aryl group having 6 to 15 carbon atoms, and the substituent may further be substituted by one or more groups represented by $X_3-SO_2-$ wherein $X_3$ is the same as defined for $X_1$ and $X_2$.

11. A membrane according to claim 8, wherein L is selected from the group consisting of an alkylene group, an arylene group and a group formed by combining these groups with at least one linking group, L may have a substituent or substituents selected from a hydroxyl group, an alkoxy group having 1 to 15 carbon atoms, a carbamoyl group, a sulfamoyl group, an alkyl group having 1 to 15 carbon atoms and an aryl group having 6 to 15 carbon atoms, and the substituent may further be substituted by one or more groups represented by $X_3-SO_2-$ wherein $X_3$ is the same as defined form $X_1$ and $X_2$.

* * * * *